United States Patent [19]

Gardner

[11] 4,380,939
[45] Apr. 26, 1983

[54] ROTARY INDEXING TABLE

[75] Inventor: Richard E. Gardner, Houston, Tex.

[73] Assignee: Cameron Iron Works, Inc., Houston, Tex.

[21] Appl. No.: 165,101

[22] Filed: Jul. 1, 1980

[51] Int. Cl.³ .......................................... B23Q 17/00
[52] U.S. Cl. .................................. 74/813 L; 74/826; 269/20; 269/69
[58] Field of Search ............... 74/813 L, 813 R, 826, 74/816, 817; 269/20, 69

[56] References Cited

U.S. PATENT DOCUMENTS

| 2,787,175 | 4/1957 | Schurger | 269/69 |
| 3,424,319 | 1/1969 | Hohlfelder, Jr. et al. | 74/817 |
| 3,786,721 | 1/1974 | Reda | 74/813 L |
| 3,941,014 | 3/1976 | Benjamin et al. | 74/826 |
| 4,159,658 | 7/1979 | Parkinson | 74/813 L |
| 4,179,106 | 12/1979 | Bergman | 269/20 |

*Primary Examiner*—Kenneth Dorner
*Attorney, Agent, or Firm*—Vinson & Elkins

[57] ABSTRACT

A rotary indexing table for use with a milling machine which has a reduced height and includes a base plate, a top plate, bearing means for mounting the top plate for rotation, means for clamping the top plate to prevent its rotation, a rotary union for transmitting hydraulic pressure to the top of the top plate to accommodate fixtures mounted on the top plate, an air chamber under the top plate so that the top plate rotates freely when air pressure is held in the chamber and indexing means to locate preselected positions of the top plate.

4 Claims, 4 Drawing Figures

ROTARY INDEXING TABLE

BACKGROUND

The machining of many products with cutting machines, such as a milling machine, has involved the use of a rotary indexing table mounted on the bed of the machine. Prior indexing or positioning tables have included the use of an air chamber on which the table floats for ease of movement (U.S. Pat. No. 3,209,623 to R. Schardt), hydraulic lifting of the table (U.S. Pat. No. 2,829,566 to E. Gecks et al.), rotary indexing tables carrying the work pieces with suitable indexing means (U.S. Pat. No. 3,153,355 to O. Opperthauser, et al., U.S. Pat. No. 1,860,840 to N. Marsilius et al. and U.S. Pat. No. 3,395,911 to J. Baxter) and hydraulic clamping of work pieces with hydraulic passages extending through a rotary coupling (U.S. Pat. No. 3,424,319 to H. Hohlfelder, Jr., et al.).

SUMMARY

The present invention relates to an improved rotary indexing table for a cutting machine. The improved table includes a base plate, a top plate mounted for rotation with respect to the base plate on suitable bearings, a ring secured to the outer portion of the top plate, a ring secured to the base plate immediately below the top plate ring, wedge type clamping means preventing rotation of the top plate, a chamber under the top plate with means supplying air thereto to float the top plate, and hydraulic connections on said top plate with hydraulic connections extending through non-rotating portions of the table to the rotating portions of the table. Means are employed to keep the height of this rotary table to a minimum, preferably under five inches, which is substantially less than the height of the available prior art rotary indexing tables.

An object of the present invention is to provide an improved rotary indexing table which is easy to rotate and to clamp in its desired positions.

Another object is to provide an improved rotary indexing table which has a minimum height.

A further object is to provide an improved rotary indexing table which provides hydraulic feed to the top of the table.

BRIEF DESCRIPTION OF THE DRAWINGS

These and other objects and advantages of the improved structure of the present invention are hereinafter set forth and explained with reference to the drawings wherein:

FIG. 4 is an enlarged sectional view of the central portion of the table.

DESCRIPTION OF THE PREFERRED EMBODIMENT

Figure 1:
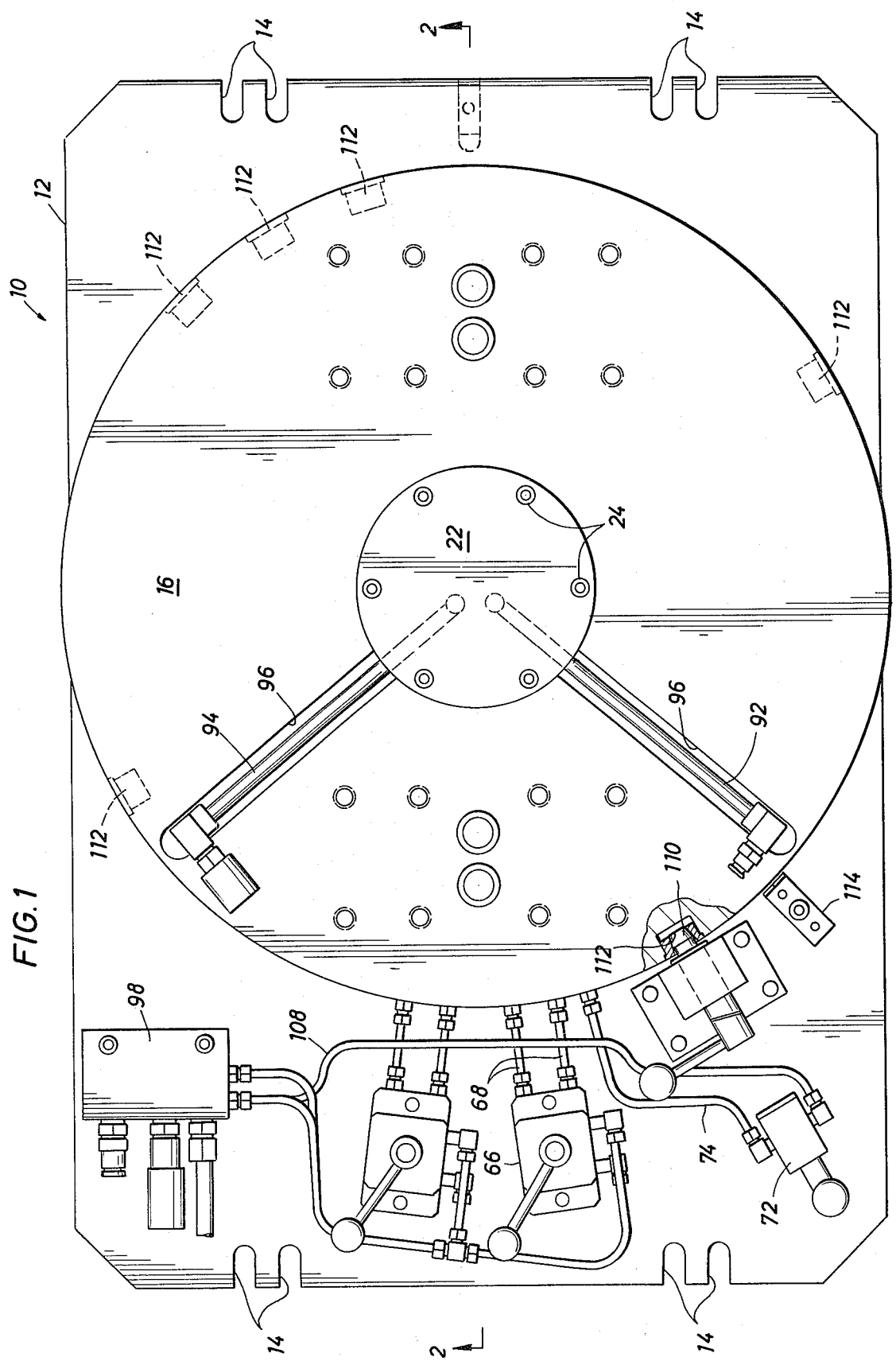
FIG. 1 is a plan view of the improved rotary indexing table of the present invention.

Table 10, as shown in the drawings, illustrates the preferred form of rotary indexing table of the present invention which is adapted to be installed on a cutting machine (not shown), such as a milling machine, to rotate and position fixtures (not shown) and the work pieces which are held by such fixtures with respect to the cutting tool of such machine.

Table 10 includes base plate 12, which is adapted to be secured to the cutting machine by suitable securing means extending through one of more of slots 14; top plate 16, on which work piece holding fixtures (not shown) are to be mounted, means for rotatably mounting top plate 16 with respect to base plate 12; and means to clamp top plate 16 against movement in relation to base plate 12.

Figure 2:
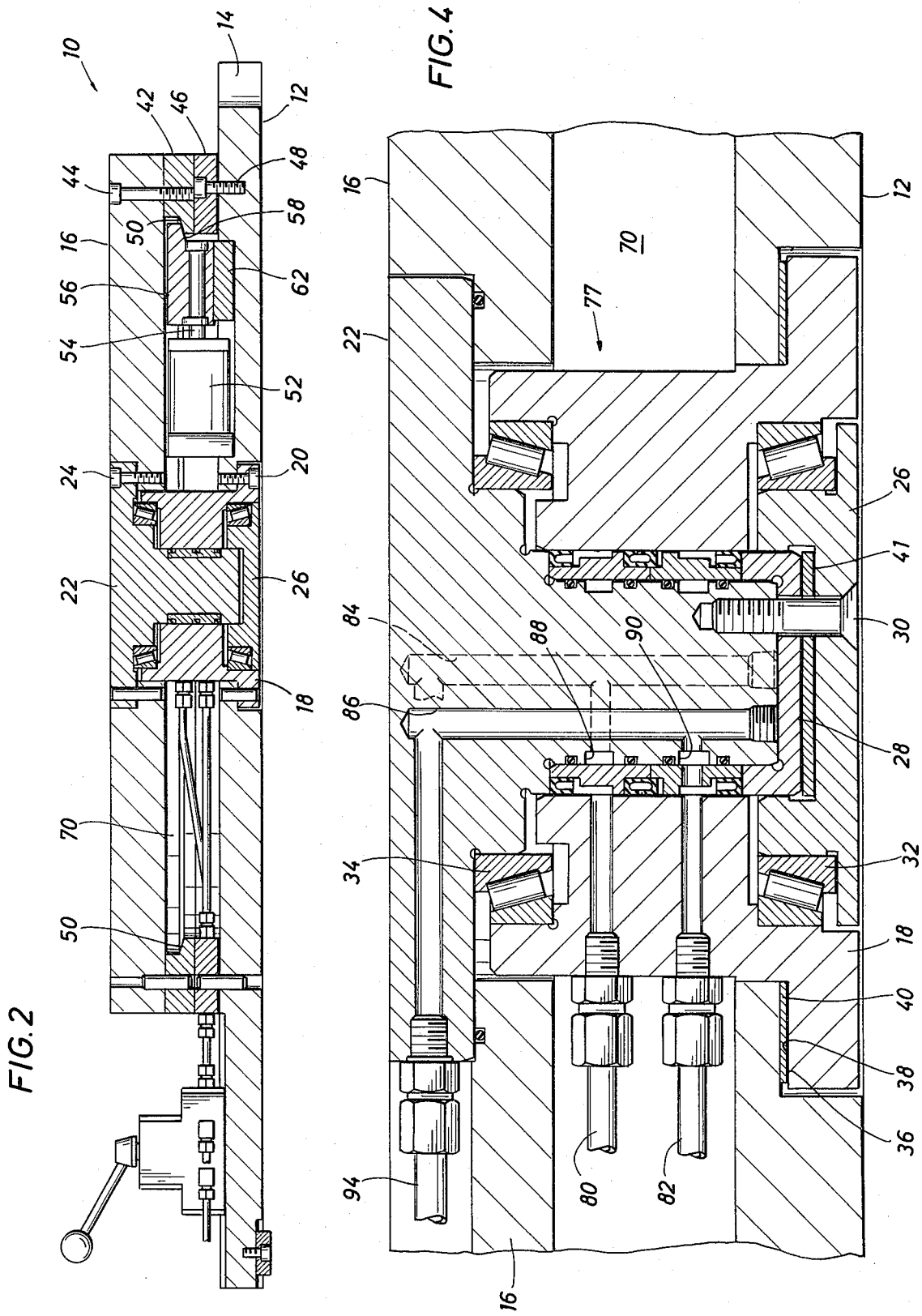
FIG. 2 is a sectional view of the table taken along line 2—2 in FIG. 1.

As shown in FIGS. 2 and 4, the mounting means shown in the drawings includes rotary union 77 which consists of sleeve 18 which is secured to base plate 12 by cap screws 20, hub 22 which is secured to top plate 16 by cap screws 24, plate 26 and cup 28 which are secured to hub 22 by cap screw 30 and tapered roller bearings 32 and 34 positioned between the rotating and non-rotating components. Shim 36, positioned between shoulder 38 on sleeve 18 and shoulder 40 on base plate 12, and shim 41, positioned between cup 28 and plate 26, are selected to control the preload on bearings 32 and 34 and the exact amount of lift available for floating top plate 16. Shims 36 and 41 are adjusted on assembly to allow for the tolerances in dimensions as hereinafter described.

Figure 3:
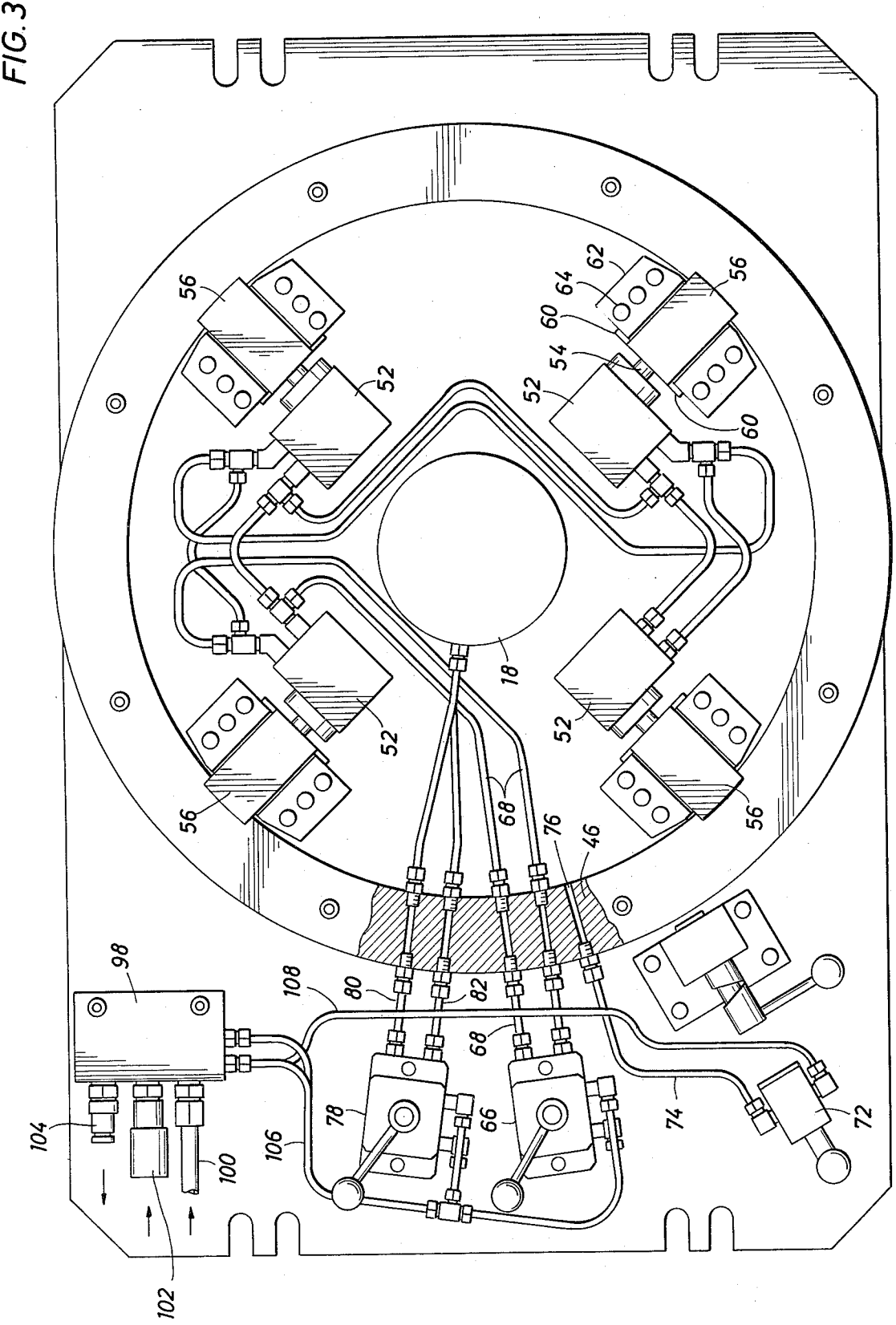
FIG. 3 is a plan view of the table structure with the top plate removed to show the hydraulic lines and the wedge clamping means.

Clamping means includes ring 42 which is secured to top plate 16 by cap screws 44, ring 46 which is secured to base plate 12 by cap screws 48 and means for wedging rings 42 and 46 together to prevent relative rotation therebetween. As shown, rings 42 and 46 have substantially the same inner diameters and outer diameters substantially the same as the outer diameter of top plate 16. Ring 42 includes surface 50 which tapers downward and inward and coacts with the wedging means. Wedging means includes a plurality of actuators 52 with their rods 54 having wedge plates 56 secured thereto and each wedge plate 56 has mating surface 58 which engages surface 50 to clamp rings 42 and 46 together when actuators 52 are extended. As shown in FIG. 3, wedge plate 56 has flanges 60 extending outward at each side and plates 62 are secured to base plate 12 by cap screws 64 and are positioned over flanges 60 to allow plate 56 to slide radially and to transmit reaction forces to base plate 12. Hydraulic fluid is supplied to actuators 52 from control valve 66 through lines 68 which extend through ring 46. Lines 68 are suitably connected so that all of actuators 52 work together to clamp or release ring 42 to thereby hold top plate 16 in preselected positions and to allow it to rotate when released.

The rotation of top plate 16 is made relatively effortless by the introduction of air under pressure into annular chamber 70 between plates 12 and 16 within rings 42 and 46 and surrounding sleeve 18. Air is supplied through valve 72 mounted on baseplate 12, line 74 and passage 76 in ring 46 to chamber 70. An air pressure of 80 psig has been found to create sufficient lift to render a 28 inch diameter top plate 16 easily rotated with a fixture and a work piece mounted thereon.

As shown in FIGS. 3 and 4, means is provided to supply hydraulic fluid under pressure to the clamping fixtures (not shown) on top plate 16. Such means include control valve 78, line 80 and 82 which extend through ring 46 and into sleeve 18. As shown, sleeve 18 and hub 22 coact so that communication is established from lines 80 and 82 to passages 84 and 86, respectively. As in other rotary unions, grooves 88 and 90 are provided in the exterior of hub 22 so that its rotation does not interfere with the communication. Also suitable seals are provided to isolate each groove and passage from the others. As shown in FIGS. 1 and 4, lines 92 and 94 connect to passages 84 and 86 and are positioned in grooves 96 in top plate 16. The rotary union 77 provides for transmission of hydraulic fluid to the top of rotary top plate 16. The union provides for the transmission of the hydraulic fluid with very little friction. The seals are provided by graphite-filled Teflon lip seals with two sets of holes and grooves providing two independent hydraulic passages.

As shown in FIG. 3, manifold block 98 is secured to base plate 12 with air line 100, hydraulic line 102 and hydraulic return line 104 connected thereto. Hydraulic lines 106 extend from manifold block 98 to control valves 66 and 78. Air line 108 conducts air from manifold block 98 to valve 72. An air return line is not needed as air is allowed to leak from chamber 70.

As shown in FIG. 1, positioning is provided for top plate 16 by the coaction of lever operated plunger 110 with one of recesses 112 in the exterior of top plate 16. Also indicator 114 is secured to base plate 12 and points to the angle markings (not shown) on the exterior of top plate 16 or ring 42.

The preload setting of bearings 32 and 34 and shims 36 and 41 is done by setting bearing 34 to have a preload of 0.001 inches with top plate in clamped position. Shim 36 is ground to provide this preloading. Bearing 32 is set to have 0.003 to 0.005 inches clearance by grinding shim 41. This provides the available movement of top plate 16 responsive to the air lift. The bearings, clamping means and the sliding surfaces are suitable lubricated.

Table 10 uses plates and rings which are accurately ground and bolted together as described. A 28 inch diameter rotating table has been provided having a height of only $4\frac{7}{8}$ inches as compared to an available commercial table which has a height of $6\frac{5}{8}$ inches. The rotating plate floats on air to reduce friction. The tapered roller bearings provide radial control and limit vertical lift to provide stability when lifting unbalanced loads. The clamping is provided at four points on ring 42 and the angle of the wedging surfaces 50 and 58 are preferred to be approximately 20° to create very rigid clamping.

What is claimed is:

1. A rotary indexing table comprising
a base plate,
a top plate,
bearing means for rotatably mounting said top plate from said base plate,
hydraulically actuated clamping means for preventing rotation of said top plate, and
means for locating preselected positions of said top plate,
said clamping means including,
a plurality of actuators,
a wedge block connected to and moved by each of said actuators, and
a tapered surface rotating with said top plate,
said wedge blocks engaging said tapered surface upon actuation of said actuators to clamp said top plate against rotation.

2. A rotary indexing table for use on a cutting machine comprising
a base plate having means for being secured to a surface,
a top plate,
bearing means for supporting the top plate in rotating relationship to said base plate,
a first ring secured to the base plate,
a second ring secured to said top plate and positioned on said first ring,
wedge means engagable with said second ring to hold said second ring and said top plate stationary,
rotary union means having a stationary and a rotary portion, said union means being secured to the center of said base plate and said top plate and having means for transmitting hydraulic pressure therebetween,
conduit means extending to said stationary portion of said union means and onto said top plate from the rotary portion of said union means,
a chamber within said rings, around said rotary union means and between said plates,
means for delivering air under a pressure to said chamber,
said bearing means allowing sufficient lifting of said top plate responsive to air pressure in said chamber to allow free rotation of said top plate, and
indexing means for locating preselected positions of said top plate with respect to said base plate.

3. A rotary indexing table comprising
a base plate,
a top plate,
bearing means for rotatably mounting said top plate from said base plate,
hydraulically actuated clamping means including coacting wedging means for preventing rotation of said top plate, and
means for locating preselected positions of said top plate,
an air chamber between said plates, and
means for delivering air to said chamber to provide an air lift of said top plate,
said bearing means including roller bearings supporting said top plate and shim means under said bearings so that they have a slight air lift whereby said bearings provide radial control and limit vertical air lift to stabilize said top plate when the load thereon is unbalanced.

4. A rotary indexing table comprising
a base plate,
a top plate,
bearing means for rotatably mounting said top plate from said base plate,
hydraulically actuated clamping means including coacting wedging means for preventing rotation of said top plate,
means for locating preselected positions of said top plate, and
hydraulic lines connecting to said clamping means and positioned within grooves in said top plate to provide a smaller overall height indexing table.

* * * * *